Nov. 17, 1970 — M. PRESTON — 3,540,310
MECHANICAL TORQUE CONVERTER
Filed June 20, 1969 — 2 Sheets-Sheet 1

INVENTOR
Martin Preston
by D. E. Moehling
Att'y

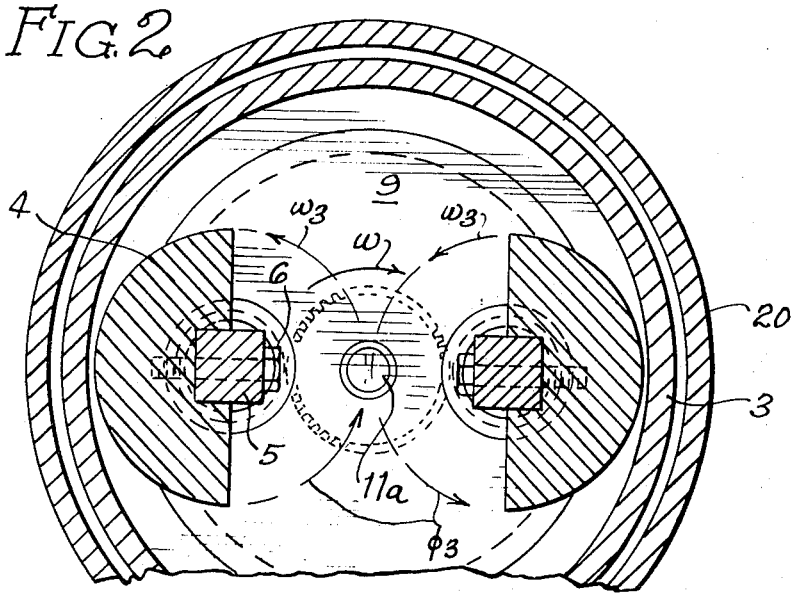
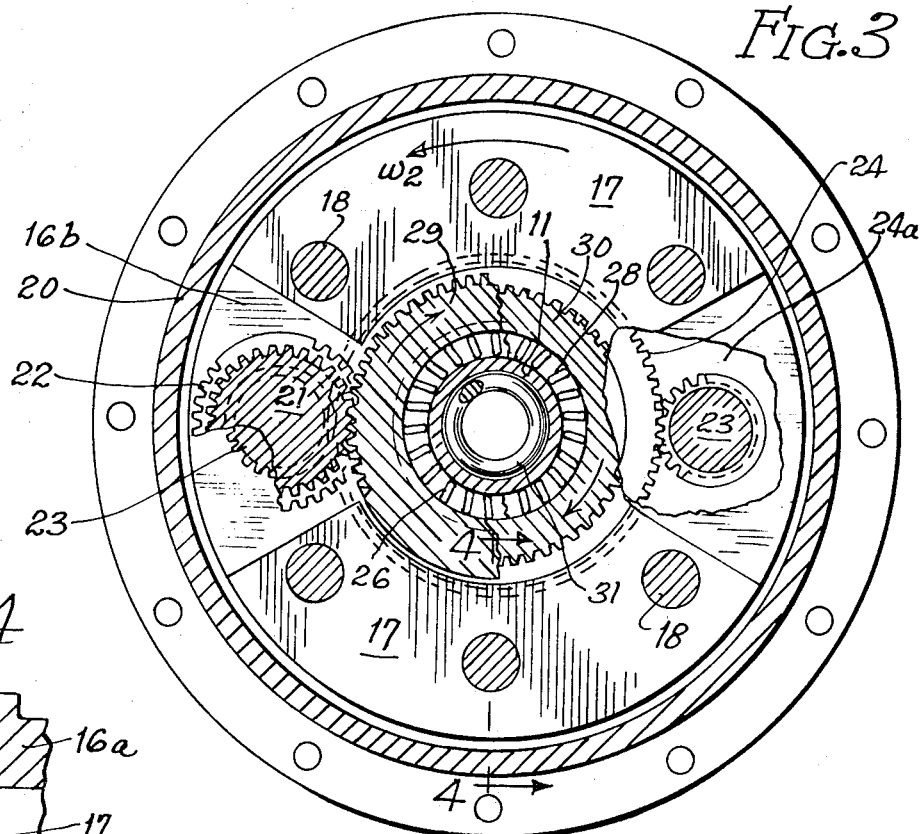

United States Patent Office 3,540,310
Patented Nov. 17, 1970

3,540,310
MECHANICAL TORQUE CONVERTER
Martin Preston, 300 N. State St., Apt. 5701,
Chicago, Ill. 60610
Filed June 20, 1969, Ser. No. 835,270
Int. Cl. F16h 3/74
U.S. Cl. 74—752                                    2 Claims

ABSTRACT OF THE DISCLOSURE

A stepless, variable-speed power transmitting device in which the ratio of the speed of the input shaft to that of the output shaft depends (a) on the external torque load applied to the output shaft and (b) on the speed of the input shaft. Power is transmitted in the device from the input to the output shaft through a spinning rotor in which a plurality of eccentric weights are journalled in such a manner that the distance of their individual centers of gravity from the rotor axis undergoes cyclical changes when the rotor is turned. Hence the kinetic energy of these rotating weights also changes periodically. Depending on the ratio of the speed of the input shaft to that of the output shaft, a varying portion of the periodic energy increment gained by the eccentric weights is transmitted to the output shaft while the remainder of this energy increment is recirculated to the input shaft.

PRIOR ART RELATED TO THIS INVENTION

The device disclosed in this application is a mechanical torque converter that incorporates a spinning rotor the axial inertia of which undergoes cyclical changes. Power is transmitted from the input shaft to the rotor during the period of increasing rotor inertia and power is returned from the rotor to the input shaft during the period of decreasing rotor inertia. The balance of these two opposite flows of power is passed on to the output shaft. This operational concept was disclosed in my U.S. Pat. 3,439,-561 filed Apr. 12, 1968. However, while the axis of the rotor of the device covered by my earlier disclosure was subjected to a continuous processional motion, the rotor axis in my present disclosure remains stationary at all times. Another feature that distinguishes structurally the device of my above cited U.S. Patent from that of my present application is that in the former concept power was transmitted intermittently between input shaft and rotor through a double power path one branch of which served to deliver energy from the input shaft through a one-way clutch to the rotor while the other branch recirculated part (or the whole) of this energy through a second one-way clutch to the input shaft. The balance of these two flows of energy was transmitted through a single power path from the rotor to the output shaft.

Contrastingly, in the present device a single power path is provided between input shaft and rotor and a double power path between rotor and output shaft.

Related to both of these mechanisms by the use of similar components but differing from both of them in its operational concept is the torque converter invented by H. F. Hobbs (described in P. M. Heldt's "Torque Converters and Transmissions" 2nd ed., pages 313-318) which uses a single power path between input shaft and rotor and between rotor and output shaft.

IDENTIFICATION OF DIAGRAMS

The invention is more fully described in the accompanying drawings, of which:

FIG. 2 is a plan sectional view taken on line 2—2 on FIG. 1.

FIG. 3 is a plan sectional view taken on line 3—3 on FIG. 1.

FIG. 4 is an elevational sectional view taken on line 4—4 on FIG. 3.

DESCRIPTION OF DIAGRAMS

Figure 1:
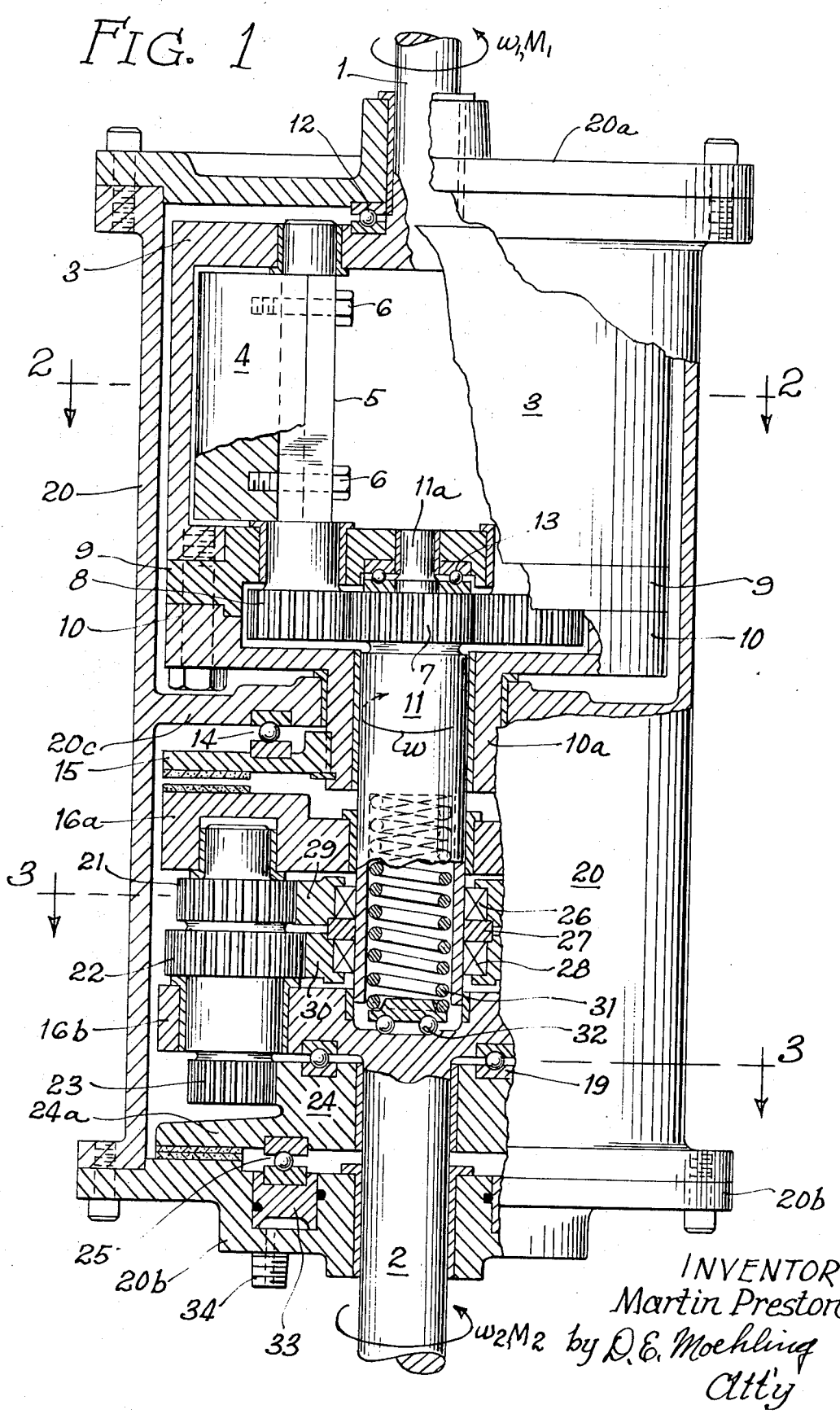
FIG. 1 is an elevational sectional view of an embodiment of the device.

The embodiment of the device shown in FIGS. 1–4 comprises a stationary housing in the form of a cylindrical shell 20 that has a removable top 20a in which input shaft 1 is journalled and a removable bottom 20b in which output shaft 2 is journalled. The interior of the housing is divided by integral flange 20c into an upper compartment which holds the rotor assembly and a lower compartment that contains the planetary gear-clutch-brake assembly. The rotor assembly comprises a cylindrical shell 3 which is integral with input shaft 1, a two-part bottom consisting of flanged disks 9 and 10 that are bolted to said rotor shell and in which rotor shaft 11 and shafts 5 of subrotors 4 are journalled. Said subrotors 4 affixed to said shafts 5 by bolts 6 have a configuration that provides a substantial eccentricity of their centers of gravity with reference to the axes of shafts 5.

Rotor shaft 11 is integral with gear 7 that meshes with gears 8 which are integral with said subrotor shafts 5 and it is held in proper alignment with the rest of the rotor assembly by the bushed, hub-like extension 10a of said disk 10 and also by thrust bearing 13 and by pilot shaft 11a which is integral with rotor shaft 11 and which is bushed in disk 9.

The rotor assembly as a whole is held in proper alignment at its top by input shaft 1 and by thrust bearing 12 and at its bottom by aforementioned internal flange 20c of the housing.

It follows from the foregoing that the turning of input shaft 1 will cause the centers of gravity of the subrotors to move on a curved path (representing an epitrochoid). The velocity of the point tracing this curve will vary along its path and it can be demonstrated that both the angular momentum as well as the kinetic energy of the rotor assembly will undergo cyclical changes while the input shaft (and the rotor shaft) is turned at constant speed.

Designating the speed of input shaft 1 by $\omega_1$, the speed of rotor shaft 11 by $\omega$ and that of subrotors 4 by $\omega_3$ and designating the direction of rotation coincident with the arrows shown in the drawings as positive, it can be shown that for constant shaft velocities the torque M produced by dynamic forces and transmitted by rotor shaft 11 to the planetary gear set is defined by the equation:

$$M = C\omega_1^2 \sin \phi_3$$

in which C is a negative constant the value of which depends on certain built-in design parameters and $\phi_3$ is the angular displacement of subrotor 4 measured from its initial position shown in FIG. 2. It follows from the above equation that the pulsating torque M is a periodic function of the angle of rotation of the subrotors and that the torque amplitude is proportional to the square of the input shaft speed $\omega_1$. It also appears that this torque is independent of the rotor shaft speed $\omega$ and that the frequency of the torque pulsations is proportional to the subrotor speed $\omega_3$ which speed in turn is proportional to the sum of input shaft speed $\omega_1$ and rotor shaft speed $\omega$.

In the previous description of the stationary housing mention was made of output shaft 2 being journalled in the housing bottom 20b and that the lower housing compartment contains an assembly of a planetary gear train, a clutch and a brake. As will be seen in the drawings, the planet carrier consisting of upper disk 16a, arcuate spacers 17 and lower disk 16b which is integral with output shaft 2, is held together by bolts 18. Journalled in this assembly are the integrally mounted planet pinions 21, 22 and 23 meshing with sun gears 29, 30 and 24, respectively. Sun gear 24 which meshes with planet pinions 23 is normally at standstill since its radially extended flat lower portion 24a which serves as a brake disk and which is covered with friction lining is normally pressed against the matching friction lining provided on the upper surface of housing bottom 20b. Prestressed helical compression spring 31 contained in the bore of rotor shaft 11 applies pressure through thrust bearings 32 and 19 to brake disk 24a and thereby locks sun gear 24 to the stationary housing. There is a double mechanical linkage between the planetary gearing and rotor shaft 11. Meshing with planet pinion 21 is sun gear 29 which is drivingly connected by one-way clutch 26 with said rotor shaft 11. Similarly, rotor shaft 11 is drivingly connected by one-way clutch 28 with sun gear 30 that meshes with planet pinion 22. The acting direction of said one-way clutches is such that (as shown in FIG. 3) sun gear 29 will drive rotor shaft 11 in the clockwise direction, but not vice versa and rotor shaft 11 will drive sun gear 30 in the clockwise direction, but not vice versa. These two mechanical linkages constitute the two branches of a double power path connecting the rotor with the output shaft. Spacer ring 27 serves to keep the two one-way clutches properly separated.

Observing that planet pinion 22 is larger than planet pinion 21 which in turn is larger than planet pinion 23, it will be readily seen that if output shaft 2 were driven in the direction indicated in FIG. 1, sun gears 29 and 30 would rotate in the direction shown in FIG. 3 which is opposite to that of the planet carrier which is rigidly affixed to the output shaft. It also follows from the foregoing that sun gear 30 will rotate at a faster rate than sun gear 29. It can be deduced from this that if, conversely, output shaft 2 were held fast and a unit torque were applied to rotor shaft 11 in the clockwise direction (FIG. 3) which would be transmitted through one-way clutch 28, sun gear 30 and planet pinion 22 to the planet carrier, the torque applied to the (externally held) output shaft will be in the (opposite) counter-clockwise direction. On the other hand, if a unit torque were applied to the rotor shaft in the counter-clockwise direction, it would be transmitted through one-way clutch 26, sun gear 29 and planet pinion 21 to the planet carrier with the result that the torque applied to the (externally held) output shaft will be in the clockwise direction and of smaller magnitude than in the former case.

It may be concluded from the foregoing that the alternating sinusoidal torque applied by the spinning subrotor to stationary rotor shaft 11 will impress an alternating torque on the (externally held) output shaft, but since the positive (counter-clockwise) pulses of this torque are larger than the negative (clockwise) pulses, the resultant torque impressed on the output shaft, will be oriented in the counterclockwise direction. This resultant average torque can ve evaluated by taking the time integral of the oscillating torque over the period of a full oscillation and dividing the result by the time period. As long as the external resistance by which the output shaft is held exceeds the resultant torque, the output shaft will remain stationary, owing to the flywheel effect of the planet carrier whose substantial inertia tends to smoothen out the torque impulses acting on the output shaft. Thus the resultant torque will become the stall torque which is, disregarding friction, proportional to the square of the input shaft speed $\omega_1$. Under these conditions no slippage will occur in the one-way clutches (neither clutch will overrun) and rotor shaft 11 will remain at standstill. It is evident that no outside work will be performed when the output shaft is stalled by an external torque load which is larger than the stall torque and hence, no energy will be absorbed by the input shaft under these conditions. Nevertheless, during a full revolution of the subrotors a complete cycle of energy changes will take place in the rotor assembly and correspondingly a sinusoidal external torque has to be applied to the input shaft to maintain its constant velocity. The time integral of this input torque is zero, yet in order to minimize the amplitude of the input torque oscillations, the ratio of the inertia of the rotor shall to that of the subrotors should be made as large as possible, or, alternatively, a substantial flywheel should be keyed to the input shaft.

Considering now the operating condition under which the external load on the output shaft is sufficiently reduced, or, alternatively, the input shaft speed is raised to the point where the stall torque exceeds the external load, it will be seen that rotor shaft 11 and output shaft 2 will start rotating in their respective directions indicated in the drawings. While the speed of the output shaft will oscillate little owing to the flywheel effect of the planet carrier, the speed of the subrotor and that of the rotor shaft geared thereto will undergo substantial cyclical changes during a full revolution of the subrotor. This follows from the principle of the conservation of angular momentum and is caused by the cyclic variation of the axial inertia of the rotor assembly.

Starting with the initial position of the subrotors shown in FIG. 2 in which position rotor shaft 11 and sun gear 30 rotate at the same speed which—as was demonstrated earlier—is higher than that of sun gear 29, the rotational speed of subrotors 4 and rotor shaft 11 begins to decrease progressively and this decrease continues until the speed of the rotor shaft drops to the speed of sun gear 29. Durin this phase of the cycle both one-way clutches 26 and 28 keep overrunning, which means that no power is transmitted through them. However, at the instant that the speed of rotor shaft 11 becomes equal to that of sun gear 29, one-way clutch 26 begins to transmit power from sun gear 29 to the rotor shaft. The source of power is the kinetic energy of the planet carrier and as long as power is being transmitted by said one-way clutch, the speed of rotor shaft 11 and of sun gear 29 will remain substantially constant. This condition will prevail until the subrotors have turned 180 degrees about their axes from their initial position shown in FIG. 2. At this point both the subrotors and the rotor shaft begin to accelerate and continue to do so until the rotor shaft attains the speed of sun gear 30. During this phase of the cycle both one-way clutches 26 and 28 keep overrunning and thus transmit no power. However, at the instant that the speed of rotor shaft 11 becomes equal to that of sun gear 30, one-way clutch 28 begins to transmit power from rotor shaft 11 through sun gear 30 to the planet carrier. From this point on until the subrotors complete their first 360 degree turn, that is, until they reach their initial position shown in FIG. 2, the rotational speed of the rotor shaft will remain substantially the same as that of sun gear 30. The cycle is then completed and a new one will begin.

The above description of the working cycle comprises 4 distinct phases. During phases 1 and 3 a slow-down, respectively, a speed-up of the rotor shaft occurs with no energy transfer between rotor and output shaft. In phase 4 energy is transmitted from the rotor to the planet carrier and in phase 2 part of this energy is returned from the planet carrier to the rotor. The balance of this energy is furnished from the outside to the input shaft on one hand and delivered from the output shaft to the outside on the other hand. During phase 1 the angle of rotation of the subrotors is the same as during phase 3 and is normally less than 180 degrees. At steady input shaft speed and at zero output shaft speed this angle is zero and it steadily increases with increasing output shaft speed. A 180 degree rotation during phase 1 presupposes the absence of phases 2 and 4, that is, absence of energy transfer between rotor shaft and planet carrier. Quantitatively the angle of rotation is related by certain built-in design parameters to the dimensionless ratio $p = \omega_2/\omega_1$ in which $\omega_2$ is the speed of the output shaft and $\omega_1$ is that of the input shaft.

A corollary of above assertion is the finding that for each particular set of design parameters (involving the geometry, mass and gear ratio of the rotating components) there is a critical limiting value of $p$ beyond which the output torque vanishes; that is, energy transfer between rotor and output shaft ceases and, hence, the device becomes inoperative. This condition arises when during phase 1 of the working cycle the rotation of the subrotors attains 180 degrees. With the judicious choice of the design parameters the critical value of $p$ can be made considerably larger than 1, in which case the output torque will vanish only if the output shaft speed considerably exceeds the speed of the input shaft. Under such conditions provision can be made to lock input and output shafts together by a friction clutch, if and when their speeds become equal. In this manner direct drive will be obtained and the entire mechanism including subrotors and planet gearing will rotate as a single solid body. The means for establishing direct drive are incorporated in the device in the form of an annular hydraulic piston 33 mounted in housing bottom 20b. The fluid is admitted to said housing bottom through nipple 34 from the outside and the application of fluid pressure to piston 33 forces (through thrust bearings 25 and 19) the planet carrier and the therewith integral output shaft 2 to move in the upward direction. This upward motion disengages brake disk 24a and at the same time brings top disk 16a of the planet carrier in contact with clutch disk 15 which is splined to the hublike extension 10a of rotor shell bottom 10. Both clutch disk 15 and the top of the planet carrier are covered with friction lining so that adequate pressure applied to bring these surfaces together will drivingly connect rotor shell 3 to the planet carrier and thus lock the input and output shafts together. The axial force introduced by hydraulic piston 33 is taken up by thrust bearings 14 held by internal housing flange 20b. The axial displacement of the output shaft caused by this force can be conveniently absorbed by a splined joint or by a flexible coupling interposed between the output shaft and the thereby driven (not shown) external object.

To provide direct drive automatically in case that input and output shaft speeds have become equal, the application of fluid pressure to the piston can be automatically triggered. For instance two identical fixed displacement fluid pumps may be driven individually from the input and output shafts of the device. Putting their hydraulic circuits in series and tapping this circuit for the control of a pilot-operated valve that admits fluid under pressure to nipple 34 on the housing bottom, the admission of fluid is thereby made conditional on identical deliveries of the two pumps which will occur only if their speeds are the same.

In the foregoing description of the functioning of the planetary gearing it was pointed out that planet pinion 23 is smaller than pinion 21 which in turn is smaller than pinion 22. This dimensional relation of the pinions in combination with the arrangement of one-way clutches 26 and 28 is accountable for the fact that the alternating torque applied by the subrotors to rotor shaft 11 will cause the latter to turn in the indicated direction of $\omega$ and also cause the rotation of the output shaft in the opposite direction.

Changing the above dimensional relationship by making planet pinion 23 the largest of the three, it will be found that, other things being equal, the direction of rotation of rotor shaft 11 will be reversed and that the input, rotor and output shafts will all turn in the same counterclockwise direction. At the same time the functioning of the device will be affected in the following way: At steady input shaft speed but with increasing output shaft speed, the frequency of torque oscillations (imposed by the subrotors on the rotor shaft) will diminish rather than increase, as was the case before. Furthermore, if the input and the rotor shaft speeds become equal, the centrifugal forces acting on the subrotors will tend to maintain this condition, under which the output shaft speed will be higher than the common speed of the input and rotor shafts.

The output torque $M_2$ can be defined with good approximation by a polynomial expression which is quadratic in the two independent variables $\omega_1$ and $\omega_2$ (input and output shaft speeds). For $\omega_2=0$, $M_2$ becomes the stall torque and the polynomial reduces to:

$$M_2 = \frac{\omega_1^2}{\pi} E e m \frac{r_2-r_1}{qr}$$

in which:

$E$=distance of subrotor axis from rotor axis
$e$=distance of center of gravity of subrotor from its axis
$m$=total mass of subrotors
$q$=ratio of number of teeth of gear 8 to gear 7
$r$=ratio of number of teeth of gear 23 to 24
$r_1$=ratio of number of teeth of gear 21 to gear 29
$r_2$=ratio of number of teeth of gear 22 to gear 30.

I claim as my invention:

1. A mechanical torque converter comprising a stationary housing in which a first shaft, an intermediate shaft and a second shaft are journalled, the first shaft being driven by an external source of power and the second shaft delivering power to the outside; a rotor assembly comprising a rotor shell which is rigidly connected to said first shaft and in which at least two subrotors are journalled, each subrotor consisting of a subrotor shaft carrying an eccentric weight and being drivingly connected by gears to said intermediate shaft in such a manner that rotation of said first shaft will cause the center of gravity of said eccentric weight to trace a curve in the shape of an epitrochoid; a first one-way clutch driven by said intermediate shaft; a first set of gear means interposed between said first one-way clutch and said second shaft; a second one-way clutch drivingly connected to said intermediate shaft; a second set of gear means interposed between said second one-way clutch and said second shaft; the said two sets of gear means constituting a bifurcated power path, one branch of which delivers intermittently power from said intermediate shaft through said first one-way clutch to said second shaft while the other branch delivers intermittently power from said second shaft through said second one-way clutch to said intermediate shaft.

2. The device of claim 1 further characterized in that said bifurcated power path consists of a compound planetary gear set comprising a planet carrier rigidly attached to said second shaft and constituting the junction of said two branches of the power path, said two sets of gear means being present in said compound planetary gear set in the form of a first sun gear driven by said first one-way clutch and meshing with a first planet pinion, a second sun gear drivingly connected with said second one-way clutch and meshing with a second planet pinion and a third sun gear meshing with a third planet pinion, said first, second and third planet pinions being integrally connected by a common shaft journalled in said planet carrier; brake means for selectively locking said third sun gear to said stationary housing; clutch means for selectively locking said planet carrier to said rotor shell.

References Cited
UNITED STATES PATENTS

| | | |
|---|---|---|
| 2,046,346 | 7/1936 | Shaw. |
| 3,154,971 | 11/1964 | Cicin. |
| 3,439,561 | 4/1969 | Preston. |

C. J. HUSAR, Primary Examiner